United States Patent [19]

Mori et al.

[11] Patent Number: 5,005,860
[45] Date of Patent: Apr. 9, 1991

[54] AIR BAG ASSEMBLY MOUNTING MECHANISM

[75] Inventors: Shinji Mori; Kozi Buma, both of Niwa; Hiroaki Shinto, Toyota, all of Japan

[73] Assignee: Kabushiki Kaisha Tokai-Rika-Denki-Seisakusho, Aichi, Japan

[21] Appl. No.: 529,443

[22] Filed: May 29, 1990

[30] Foreign Application Priority Data

May 31, 1989 [JP] Japan .............................. 1-63291[U]

[51] Int. Cl.⁵ .............................................. B60R 21/16
[52] U.S. Cl. ....................................... 280/731; 280/732
[58] Field of Search ................. 280/728, 731, 732, 743

[56] References Cited

U.S. PATENT DOCUMENTS

| 3,945,665 | 3/1976 | Tsutsumi et al. | 280/731 |
| 4,877,264 | 10/1989 | Cuevas | 280/731 |
| 4,938,500 | 7/1990 | Nakazato et al. | 280/731 |
| 4,938,503 | 7/1990 | Muraoka et al. | 280/731 |
| 4,943,027 | 7/1990 | Nakayama et al. | 280/743 |

Primary Examiner—Kenneth R. Rice
Attorney, Agent, or Firm—Oliff & Berridge

[57] ABSTRACT

A mechanism for mounting an air bag assembly on a steering wheel. Before the air bag assembly is firmly screwed to the steering wheel, claws projecting from the air bag assembly engage with claws of the steering wheel so as to temporarily fix the air bag assembly to the steering wheel. Subsequently, the air bag assembly is screwed to the steering wheel, and the air bag assembly does not move inadvertently without being manually pressed firmly at the time of screwing, thereby rendering the mounting operation speedy and accurate.

20 Claims, 4 Drawing Sheets

AIR BAG ASSEMBLY MOUNTING MECHANISM

BACKGROUND OF THE INVENTION

1. Field of the Invention

The present invention relates to an air bag assembly mounting mechanism for mounting an air bag assembly onto a steering wheel of a vehicle.

2. Description of the Related Art

Conventionally, vehicles are known to be provided with an air bag device mounted on a steering wheel or the like of a vehicle for protecting an occupant at the time of sharp deceleration of the vehicle.

This air bag device comprises an air bag assembly main body for accommodating therein an air bag for protecting an occupant by inflating at the time of the sharp deceleration of the vehicle, as well as mounting members for mounting the air bag assembly main body onto a mounting portion of the steering wheel or the like.

As shown in FIG. 4, when such an air bag assembly main body 100 is secured to a pair of mounting members 104 provided on a hub 102A of a steering wheel 102, the air bag assembly main body 100 is secured to the mounting members 104 by means of bolts 108 by using an impact wrench 106 or the like for imparting torque through pneumatic pressure.

However, when the bolt 108 is screwed into the mounting members 104 and the air bag assembly main body 100 by means of the impact wrench 106, a pressing force acts on the air bag assembly main body 100 in the direction of arrow A. For this reason, there are cases where since the impact wrench 106 is thrust upward, the air bag assembly main body 100 floats upward, thereby making it impossible to speedily secure the air bag assembly main body 100 onto the mounting members 104.

Hence, there has been drawback that the operator must support the air bag assembly main body 100 by pressing it in the direction of the hub 102A of the steering wheel 102 in order to prevent the air bag assembly main body 100 form floating upward owing to the thrusting upward of the impact wrench 106.

SUMMARY OF THE INVENTION

Accordingly, an object of the present invention is to provide an air bag assembly mounting mechanism for mounting an air bag assembly, to be mounted on amounting member, which does not require the operator to support the air bag assembly main body by pressing the same at the time of the installation of the air bag assembly main body, thereby overcoming the above-described drawback of the conventional art.

To this end, in accordance with the present invention, an air bag assembly is mounted on a chassis by means of a temporary fixing mechanism and a fixing mechanism. The temporary fixing mechanism is used before the fixing mechanism, and the air bag assembly is temporarily fixed to the chassis or the steering wheel by being simply pressed against the same. Claws for allowing the air bag assembly and the chassis to be engaged with each other are used as the temporary fixing mechanisms.

The engaging force obtained by this temporary fixing is set to a magnitude capable of sufficiently supporting a reaction force of bolts or the like used as the fixing mechanism at the time of assembling. Accordingly, there is no need to effect the tightening of the bolts while holding the air bag assembly for supporting the reaction force, so that a speedy operation becomes possible.

DESCRIPTION OF THE PREFERRED EMBODIMENT

Figure 1:
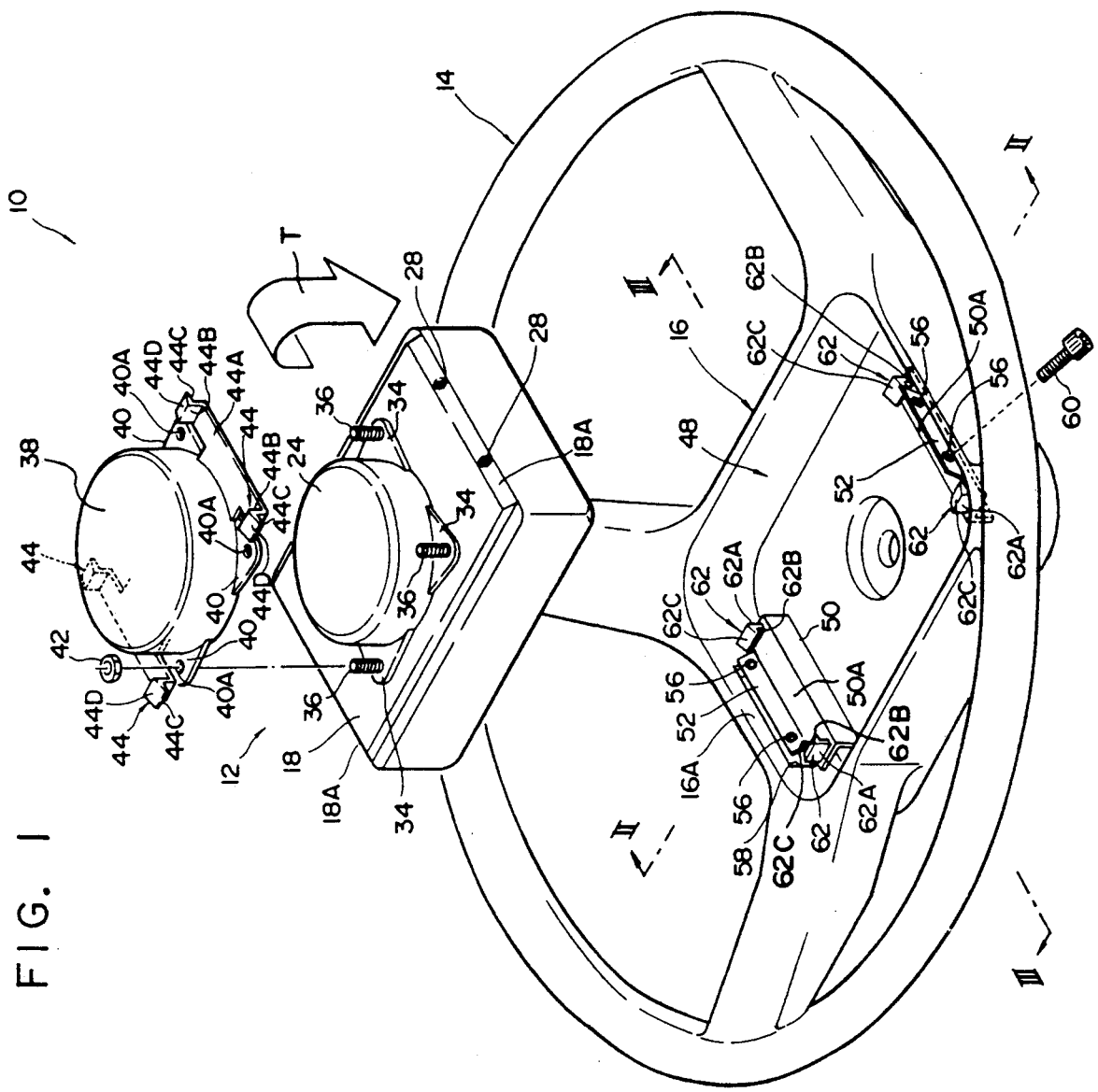
FIG. 1 is an exploded perspective view illustrating an embodiment of the present invention.
Figure 2:
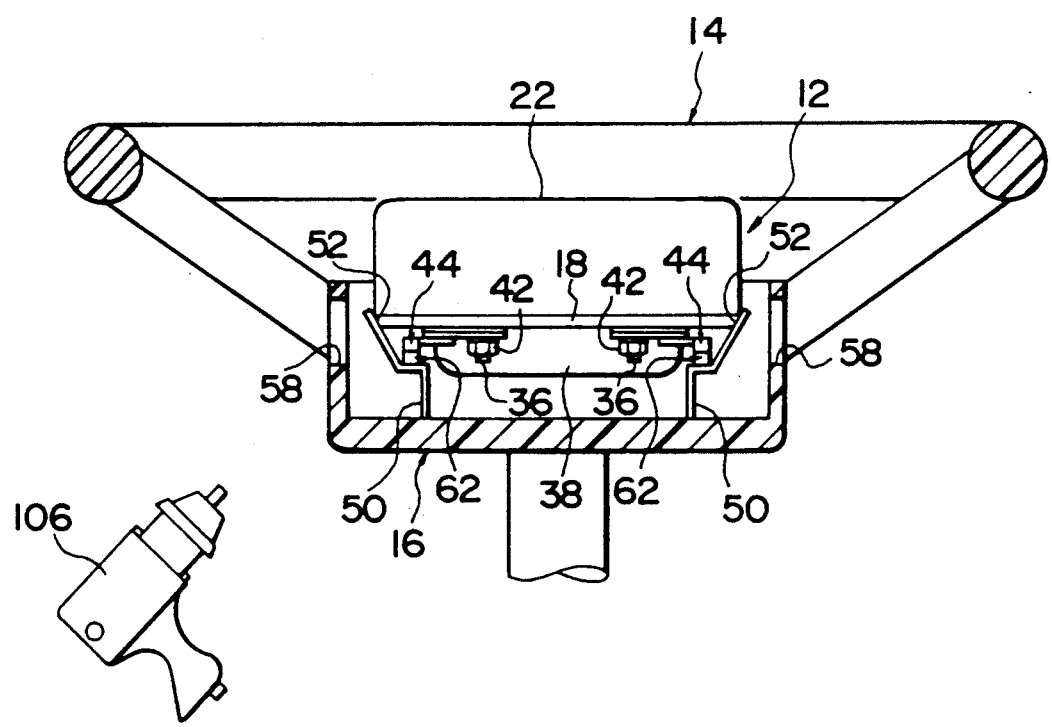
FIG. 2 is a cross-sectional view taken along the line II—II of FIG. 1.
Figure 3:
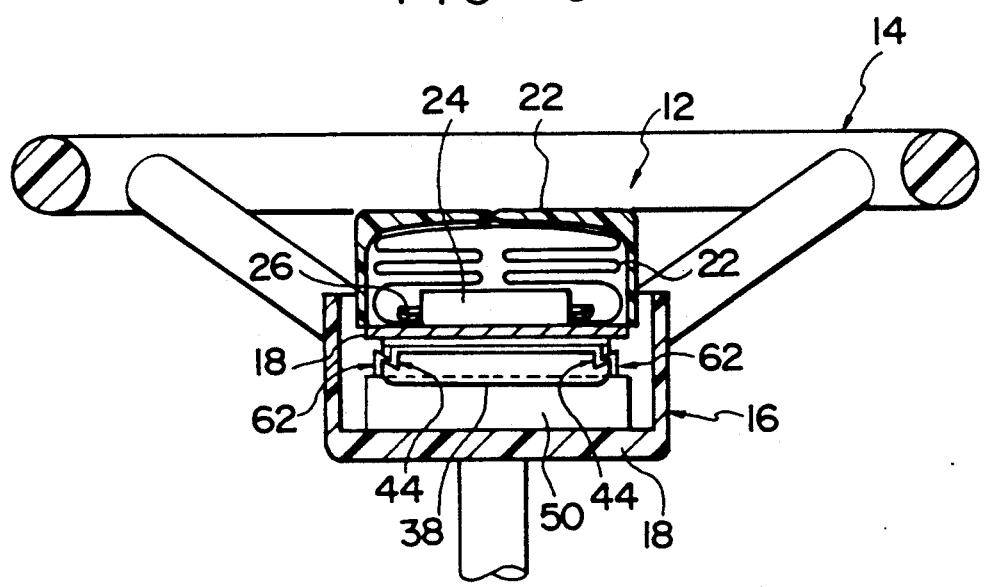
FIG. 3 is a cross-sectional view taken along the line III—III of FIG. 1.
Figure 4:
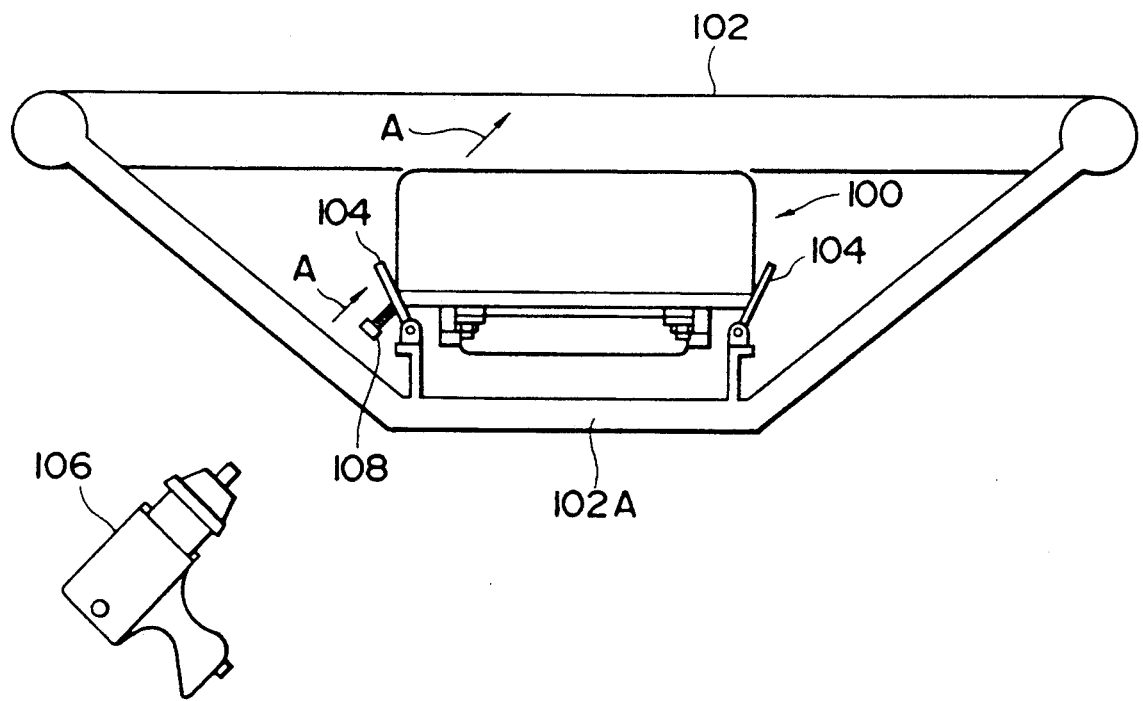
FIG. 4 is a cross-sectional view illustrating the installation of a conventional air bag assembly.

FIGS. 1 to 3 illustrate an embodiment of an air bag device 10 in accordance with the present invention.

As shown in FIG. 1, an air bag assembly main body 12 is adapted to be accommodated in an accommodating portion 16 serving as a mounting portion and formed in a steering wheel 14.

As shown in FIG. 3, an air bag 20, a cover 22, and an inflator 24 are provided on a base plate 18 which is a constituent member of the air bag assembly main body 12.

The air bag 20 is disposed in a state in which it is folded in the form of a bellows on the base plate 18 on the occupant's side (upper side in FIG. 3). A rim of the air bag 20 on the side of its opening is attached to a substantially central portion of the base plate 18 via a ring plate 26. The ring plate 26 is fixed to the base plate 18 through an unillustrated fixing means such as bolts and presses the opening-side rim of the air bag 20 against the base plate 18.

The cover 22 is disposed on the occupant's side (upper side in FIG. 3) of the base plate 18, and accommodates the air bag 20 between the same and the base plate 18. An unillustrated frame-like core metal is embedded in a peripheral portion of the cover 22, and the cover 22 is attached to the base plate 18 via the core metal by means of rivets or the like. As shown in FIG. 1, both side surfaces 18A of the base plate 18 are inclined, and two screw holes 28 are provided therein at a predetermined interval. As shown in FIG. 3, thin-walled portions 22A are formed in portions of the cover 22 opposing the base plate 18, and the cover 22 is adapted to be easily broken off at these portions 22A.

The inflator 24, which is formed into a cylindrical configuration, is disposed by being passed through a substantially central portion of the base plate 18 with its upper half portion inserted in the air bag 20.

As shown in FIG. 1, four flanges 34 are formed radially on outer peripheral portions of the inflator 24 abutting against the base plate 18. Screws 36 are secured to the flange portions 34 in such a manner as to project away from the occupant.

An unillustrated gas producing substance is sealed in the inflator 24, and an igniting device to combust the gas producing substance is incorporated therein.

The gas producing substance is decomposed by combustion and thereby omits a large amount of gas which inflates the air bag 20. An inflator cover 38 covers a portion of the inflator 24 projecting outwardly from the base plate 18.

The inflator cover 38 is formed of a flexible member such as a synthetic resin. Four flanges 40 are formed on an outer periphery of the inflator cover 38 in correspondence with the flanges 34. A screw hole 40A is formed in each of the flanges 40, and a nut 42 is threadedly engaged with the hole 40A after the screw 36 is inserted into it, whereby the inflator cover 38 is secured to the inflator 24.

Four claw portions 44 serving as first retaining members are formed integrally on opposite side portions of the inflator cover 38. These claw portions 44 are respectively formed in the vicinity of the flanges 40 via claw portion supporting pieces 44A in such a manner as to project from the inflator cover 38. Each of these claw portion supporting pieces 44A has a substantially rectangular configuration as viewed from its top, and rising portions 44B respectively rising form longitudinally opposite ends thereof being formed by being bent in a direction perpendicular to the inflator cover 38. As for four retaining portions 44C of the claw portions 44, two pieces on one side of the inflator cover 38 extend in mutually opposite directions, while the other two pieces on the other side similarly extend in mutually opposite directions. A distal end surface of each of the falling portions is formed as a guide portion 44D which is inclined with respect to the axial direction of the inflator cover 38.

As indicated by arrow T in FIG. 1, the air bag assembly main body 12 is inverted, i.e., is accommodated and secured in the accommodating portion 16 formed in the steering wheel 14 with the inflator cover 38 facing the accommodating portion 16. A substantially rectangular recess 48 is formed in the accommodating portion 16. A pair of brackets 50 are provided in the recess 48 in such a manner as to face each other. Each of these brackets 50 has an inverse L-shaped configuration as viewed from its side, and a supporting piece 52 is secured to a distal end of a top plate 50A thereof in such a manner as to be inclined in the axial direction of the steering wheel 14. Accordingly, the side surface 18A of the base plate 18 and the supporting piece 52 are adapted to abut against each other. A pair of screw holes 56 are formed in the supporting piece 52 by being spaced apart in the longitudinal direction of the supporting piece 52 at the same interval as that of the screw holes 28 of the base plate 18.

A pair of claw portions 62 serving as second retaining members are formed at opposite ends of the top plate 50A of each of the brackets 50 in such a manner as to sandwich the supporting piece 52. After rising from the top plate 50A of the bracket 50, rising portions 62A of the pair of claw portions 62 are bent orthogonally toward the supporting piece 52 in such a manner as to face each other, thereby forming a pair of retaining portions 62A. A distal end of the rising portion 62A is inclined to form a guide portion 62C. In addition, as the claw portions 62 are engaged with the claw portions 44, the air bag assembly main body 12 is secured temporarily to the steering wheel 14.

A rectangular notch 58 is formed in a wall portion 16A of the accommodating portion 16 corresponding to the supporting piece 52, and screws 60 are adapted to be inserted into the respective screw holes 56 through the notch 58.

A description will now be given of the operation of this embodiment.

When the air bag device 10 is to be mounted on the steering wheel 14, the air bag assembly main body 12 is first accommodated in the accommodating portion 16 of the steering wheel 14. In this case, since the claw portions 44 of the air bag assembly main body 12 and the claw portions 62 of the brackets 50 are formed at corresponding positions, if an attempt is made to accommodate the air bag assembly main body 12 in the accommodating portion 16, the surface of the guide portion 44D of each claw portion 44 of the air bag assembly main body 12 and the surface of the guide portion 62C of each claw portion 62 of the accommodating portion 16 are brought into contact with each other. Consequently, if the air bag assembly main body 12 is pressed, the guide portions 44D of the claw portions 44 are slid on and guided by the guiding portions 62C of the claw portions 62, and are deformed by being bent toward the inner side of the rising poritons 44B and the rising portions 62A, respectively. Then, when the guide portions 44D move closer to the vicinity of the bracket 50 than the guide portions 62C, the rising portions 44B and the rising portions 62A are resiliently returned, allowing the retaining portions 44C of the claw portions 44 and the retaining portions 62B of the claw portions 62 to be brought into contact with each other and thus allowing the claw portions 44 and the corresponding claw portions 62 to engage with each other. As a result, the air bag assembly main body 12 is tentatively secured to the steering wheel 14.

Next, the operator inserts each screw 60 through the notch 58 formed in the wall poriton 16A, inserts it into the screw hole 56 of the supporting piece 52, and screws it into the screw hole 28 formed in the side surface 18A of the base plate 18. At this juncture, since the air bag assembly main body 12 is temporarily secured to the accommodating portion 16, even if the screwing operation of the screw 60 is effected by using an impact wrench 106 or the like, its reaction force is positively supported by the engaging portions of the guide portions 62C and 44D, so that the air bag assembly main body 12 is prevented from moving. Hence, the operator is capable of devoting himself to the screwing operation, and the work efficiency is therefore improved. Then, if all the screws 60 are screwed in, the air bag device 10 is completely mounted on the steering wheel 14.

Accordingly, during the mounting operation there is no need for the operator to continue pressing the air bag assembly main body 12 or pay heed to the movement of the air bag assembly main body 12, so that the operation of mounting the air bag device 10 can be effected promptly and readily.

What is claimed is:

1. An air bag assembly mounting mechanism for mounting an air bag assembly onto a steering wheel of a vehicle, comprising:
   fixing means for fixing said air bag assembly to a chassis; and
   temporary fixing means for temporarily fixing said air bag assembly to said chassis, having engaging portions provided on said chassis and said air bag assembly, respectively, said temporary fixing means temporarily fixing said air bag assembly as said engaging portions are engaged with each other, thereby supporting the air bag assembly to counteract a reaction force of said fixing means during fixing.

2. An air bag assembly mounting mechanism according to claim 1, further comprising guiding means for guiding said engaging portions into an engaging state as said air bag assembly is pressed against said chassis.

3. An air bag assembly mounting mechanism according to claim 2, wherein each of said engaging portions has an arm whose distal end is bent into a form of a hook.

4. An air bag assembly mounting mechanism according to claim 3, wherein said guiding means is an inclined surface formed on said distal end of each of said arms.

5. An air bag assembly mounting mechanism according to claim 1, wherein said engaging portions are provided on opposite sides of said fixing means.

6. An air bag assembly mounting mechanism according to claim 1, wherein one of said engaging portions projects from said chassis, and the other engaging portion which engages therewith is provided uprightly on a cover for covering an inflator of said air bag assembly.

7. An air bag assembly mounting mechanism according to claim 6, wherein said engaging portion provided uprightly on said inflator cover is disposed on a supporting piece projecting integrally from said inflator cover.

8. An air bag assembly mounting mechanism according to claim 7, wherein a pair of said supporting pieces are respectively disposed on opposite sides of said inflator.

9. An air bag assembly mounting mechanism according to claim 1, wherein said fixing means is disposed on said steering wheel and includes a pair of brackets disposed at mutually opposite positions with a steering shaft interposed therebetween.

10. An air bag assembly mounting mechanism according to claim 9, wherein opposing surfaces of said brackets are inclined in such a manner as to open in the direction of inflation of said air bag, a tightening screw being threadedly engaged with said air bag assembly through each of said brackets.

11. An air bag assembly mounting mechanism according to claim 10, wherein said temporary fixing means are respectively disposed on opposite sides of each of said brackets, a pair of engaging portions constituting a part of said temporary fixing means and provided on said steering wheel, or a pair of engaging portions provided on said air bag assembly and adapted to engage with said engaging portions have distal ends bent in a mutually approaching direction.

12. An air bag assembly mounting mechanism according to claim 11, wherein inclined surfaces of said engaging portions which are provided on said air bag assembly and whose distal ends are bent in the mutually approaching direction are used as guide surfaces at the time of mounting of said air bag assembly so as to guide corresponding ones of said engaging portions into a state of engagement with said engaging portions.

13. An air bag assembly mounting mechanism for mounting said air bag assembly onto a chassis of a vehicle, comprising:
a plurality of first engaging claws projecting from a steering wheel;
a plurality of second engaging claws projection from said air bag assembly and adapted to allow said air bag assembly to be temporarily fixing to said steering wheel by being engaged with said first engaging claws;
a mounting bracket disposed on said steering wheel and adapted to mount said air bag assembly; and
a plurality of screw hole portions disposed in said air bag assembly and adapted to fix said air bag assembly to said steering wheel as a plurality of screws inserted through said bracket are threadedly engaged therewith, said air bag assembly receiving a reaction force in a direction away from said steering wheel when each of said screws is threadedly engaged with each of said screw hole portions.

14. An air bag assembly mounting mechanism according to claim 13, wherein said bracket is interposed between said plurality of first engaging claws.

15. An air bag assembly mounting mechanism according to claim 13, wherein a pair of said brackets are provided at mutually opposite positions with a steering shaft interposed therebetween.

16. An air bag assembly mounting mechanism according to claim 14, wherein said plurality of first engaging claws have distal ends bent in a mutually approaching direction.

17. An air bag assembly mounting mechanism according to claim 16, wherein a surface of each of said plurality of first engaging claws on the air bag assembly side is formed as a guide surface for a corresponding one of said second engaging claws and is adapted to guide each of said second engaging claws to a corresponding one of said first engaging claws.

18. An air bag assembly mounting mechanism according to claim 13, wherein each of said second engaging claws is formed in such a manner as to project integrally form an inflator cover of said air bag assembly.

19. An air bag assembly mounting mechanism for mounting an air bag assembly onto a steering wheel of a vehicle, comprising:
a first engaging claw disposed on said steering wheel and extending integrally form an inflator cover;
a second engaging claw disposed on said air bag assembly and adapted to allow said air bag assembly to be temporarily fixed to said steering wheel by being engaged with said first engaging claw;
a mounting bracket disposed on said steering wheel; and
a screw hole portion provided in said air bag assembly, a fixing screw inserted through said bracket being adapted to threadedly engage with said screw hole portion.

20. An air bag assembly mounting mechanism according to claim 19, wherein said first and second engaging claws are respectively provided on opposite sides of said fixing screw and a threadedly engaging portion of said screw hole portion.

* * * * *